(12) United States Patent
Michiels

(10) Patent No.: US 6,586,059 B1
(45) Date of Patent: Jul. 1, 2003

(54) FLAME RETARDANT/HEAT RESISTANT MATERIAL

(76) Inventor: Dany Felix Marie Michiels, Bosstratt 40A, 9450 Haltert (BE)

( * ) Notice: Subject to any disclaimer, the term of this patent is extended or adjusted under 35 U.S.C. 154(b) by 0 days.

(21) Appl. No.: 09/304,865

(22) Filed: May 4, 1999

(30) Foreign Application Priority Data

May 7, 1998 (EP) .............................. 98303603

(51) Int. Cl.[7] ...................... C09K 21/04; D06M 11/72; B60R 21/20
(52) U.S. Cl. ................... 428/35.2; 106/455; 280/728.1; 526/329.3; 428/36.1; 252/608
(58) Field of Search ............................. 428/35.2, 35.6, 428/35.7, 36.1; 524/101, 140, 416, 409, 127, 141, 80, 417; 106/455; 280/728.1; 526/329.3, 329.4, 307, 307.1, 303, 318, 318.4, 317.1, 319; 252/608–610

(56) References Cited

U.S. PATENT DOCUMENTS

| | | | |
|---|---|---|---|
| 3,935,149 A | * | 1/1976 | Kraft et al. ................. 260/29.6 |
| 3,953,540 A | * | 4/1976 | Takezoe et al. ......... 260/878 R |
| 4,284,682 A | | 8/1981 | Tschirch et al. ............ 428/263 |
| 4,345,002 A | * | 8/1982 | Smith et al. ................ 428/288 |
| 4,702,861 A | | 10/1987 | Farnum ....................... 252/601 |
| 4,808,476 A | | 2/1989 | Mikus et al. ................ 428/413 |
| 5,135,974 A | * | 8/1992 | Moore ........................ 524/101 |
| 5,204,393 A | * | 4/1993 | Nalepa et al. .............. 524/101 |
| 5,413,828 A | * | 5/1995 | De Keyser ................. 428/36.5 |
| 5,531,469 A | | 7/1996 | Iino et al. ................. 280/728.3 |
| 5,721,046 A | | 2/1998 | Shrewsburg et al. ...... 428/304.4 |
| 5,897,929 A | * | 4/1999 | Li et al. .................... 428/36.1 |

OTHER PUBLICATIONS

Nissan Chemical, Derwent 1988–357731.*
Mark et al., Encyclopaedia of polymer science and engineering, vol. 17, 1989, p 499.*

* cited by examiner

Primary Examiner—Harold Pyon
Assistant Examiner—Sow-Fun Hon
(74) Attorney, Agent, or Firm—Terry T. Moyer; William S. Parks

(57) ABSTRACT

The invention provides a flame retardant/heat resistant agent and adhesive, which includes one or more oxides of phosphorus, antimony, silicon and melamine cyanurate as the flame retardant agents and which can increase both the flame retardant/heat resistance of the cloth material and the binding strength of the cloth to a variety of thermoplastic polymers. The invention can be used in strengthening applications such as thermoplastic automobile accessories such as airbag deployment doors where a flame retardance/heat resistance is also required.

24 Claims, No Drawings

FLAME RETARDANT/HEAT RESISTANT MATERIAL

The present invention relates to a flame retardant/heat resistant agent and adhesive and flame retardant/heat resistant cloth material, particularly to the application of a flame retardant/heat resistant adhesive to cloth material that may be used to support a polymeric material attached thereto.

There are several known methods for improving the flame retardance of cloth materials. One method is the inclusion of an inorganic silica containing compound within the fiber of the cloth to give increased heat and flame resistance to the cloth. Examples of such applications include fire blankets, which can have glass fiber incorporated within the weave of the fabric. The glass fabric gives strength to the cloth and helps to prevent flame penetration as it is nonflammable. However the glass fibers are heavy and can be difficult to work with. Of course, the use of asbestos, a naturally occurring fibrous silica compound, has been restricted due to its associated problems.

Alternatively, the flame resistance of most cloth materials can be enhanced by the impregnation of the material with a flame retarding agent. Agents used are generally high oxidation state salts or compounds of non-metal oxides, such as phosphates and sulphates. Although this method of improving the flame retardance of cloth is highly flexible, it does not necessarily improve the bonding of the cloth material to any plastic applied thereto.

Some other materials are naturally flame retardant, examples include some polyamides and aramids such as Kevlar. These materials have the disadvantage that they can be unsuitable for cloth material, particularly when providing a fiber that can be woven into cloth.

It is an object of the present invention to provide a flame retardant/heat resistant agent and adhesive, which can be applied to cloth material, rendering the cloth material flame retardant/heat resistant, and which improves the binding of the cloth material to a variety of thermoplastic polymers.

The present invention provides a flame retardant/heat resistant agent comprising antimony and phosphorus oxide compounds.

Optionally the flame retardant/heat resistant agent also includes one or more compounds selected from the group including silicates and melamine cyanurate.

Preferably the fabric material is rendered flame retardant/heat resistant by being sprayed with the flame retardant/heat resistant agent or being immersed in said agent.

The invention also provides a flame retardant/heat resistant adhesive comprising antimony and phosphorus oxide compounds.

Most preferably said antimony and phosphorus oxide compounds are antimony trioxide and/or pentoxide and the ammonium salt of polyphosphate.

Optionally said flame retardant/heat resistant agent is a mixture of melamine cyanurate, silicates and ammonium polyphosphate and antimony oxides.

Preferably also the fabric material, to which the adhesive can be applied is knitted.

Optionally the fabric material, to which the adhesive can be applied, is woven using the leno weave method.

Preferably also the fabric material is selected from the group consisting of polyesters, Nylon 6/6, Nylon 12, polyamides, copolyerised polyamides and Rayon.

Preferably also the weight of the cloth when knitted/woven is between 125 and 670 grams per square meter.

In a preferred embodiment said fabric material is dipped in DMK/F12, a chlorinated acrylonitrile copolymer, mixed with a combination of antimony and phosphorus oxide compounds.

Preferably also the adhesive is applied as a coating to the fabric material at between 40–110 grams per square meter.

Preferably also the adhesive coating is based upon one of the group consisting of chlorinated acrylonitrile copolymers or PVC.

Optionally the adhesive coating may be based on melamine Cyanurate.

More preferably said adhesive also contains a mixture of phosphorus and antimony oxides as a flame retardant agent.

Most preferably said adhesive coating is a PVC adhesive, impregnated with a mixture of antimony phosphorus oxide compounds.

Preferably the thermoplastic polymer materials are selected from the group consisting of polypropylene, acrylonitrile-butadiene-styrene, thermoplastic olefins, polycarbonates, PVC, nylon 6/6 and copolymers, mixtures and/or halogenated analogues thereof.

In a preferred embodiment the flame retardant/heat resistant adhesive of the present invention is applied to cloth material which is used as a backing material to thermoplastic olefin based polymers. The combination of thermopolymer and backing material produced can be utilized as deployment doors for car airbags, particularly for car passenger airbags, where the cloth material ensures that the deployment of the airbag does not cause destruction of the airbag deployment door.

In a further embodiment the flame retardant/heat resistant adhesive is applied to cloth material which is used as a strengthening material in thermoplastic construction such as automobile bumpers and plastic pipes.

The preferred embodiment of the invention when applied to cloth material provides a very thermostable (240–260° C.) flame retardant cloth material that has a high cohesion and adhesion to several plastics, including; polypropylene, ABS, thermoplastic olefins, polycarbonates, PVC and nylon 6/6. As a result of the leno weave construction the cloth material has a high tear strength due to the double warp. Also the leno weave gives the material a high crimp and high flexibility. The adhesive finish give the cloth material a finish that includes suitable stiffness for the extrusion process and good compound penetration as well as the heat resistant/flame retardant qualities.

The flame retardant/heat resistant adhesive of the present invention will now be further described with reference to the following examples.

EXAMPLE 1

The process for making the chemical finish, which forms the basis of the above invention is a 2 step process:

The chemical mix consists of a Basic Mix (referred to as DMK/F12) and a Sub Mix. Table one shows the: composition parameters of the Basic Mix. Table two shows the ideal composition of the basic mix.

TABLE 1

| Ingredient | Content (%) | |
| --- | --- | --- |
| | MIN | MAX |
| Anionic carboxyl group containing copolymer of 1,1-dichloroethane, acrylonitrile and methyl acrylate | 22 | 31 |
| Antimony Trioxide | 3 | 7 |
| Antimony Pentoxide | 3 | 5 |
| Alkylammonium salt of a high molecular weight polycarboxylic acid | 0.1 | 0.3 |

TABLE 1-continued

| Ingredient | Content (%) MIN | Content (%) MAX |
|---|---|---|
| Polyether urea polyurethane dissolved in water/diethylene glycolether | 1 | 2 |
| 1,2-ethanediol | 1 | 3 |
| Tenside containing sodium alkyl sulphonate and $C_{13}$ ethoxy oxoalcohol | 0.1 | 0.3 |
| Cellulose ether derivate | 0.3 | 0.5 |
| Phosphoester based upon $C_{13}$ Alkoxy alcohols, hexyleneglycol and triisobutylphosphate | 0.1 | 0.2 |
| Ammonium polyphosphate | 1 | 1.5 |
| Pulverized polyethylene dispersion | 0.9 | 1.5 |
| Water | 49.3 | 68 |
| Modified mineral oil | 0.2 | 0.4 |

TABLE 2

| Ingredient | Content (%) |
|---|---|
| Anionic carboxyl group containing copolymer of 1,1-dichloroethane, acrylonitrile and methyl acrylate | 29.8 |
| Antimony Trioxide | 6.7 |
| Antimony Pentoxide | 3 |
| Alkylammonium salt of a high molecular weight polycarboxylic acid | 0.2 |
| Polyether urea polyurethane dissolved in water/diethylene glycolether | 1.4 |
| 1,2-ethanediol | 2.5 |
| Tenside containing sodium alkyl sulphonate and $C_{13}$ alkoxy alcohol | 0.2 |
| Cellulose ether derivate | 0.4 |
| Phosphoester based upon $C_{13}$ Alkoxy alcohols, hexyleneglycol and triisobutylphosphate | 0.1 |
| Ammonium polyphosphate | 1.1 |
| Pulverised polyethylene dispersion | 1.2 |
| Water | 53.2 |
| Modified mineral oil | .02 |

The Basic Mix is made up and then an antifoam agent, Nopco NX2® is added, followed by a colorant e.g. Neoprints (Lamberti) or Helizarine (BASF).

The Sub Mix is an Ammonia 1/1 solution, consisting of 1 kilogram each of ammonia and water.

Formulation and Mix Procedure

The formulation of the flame retardant/heat resistant agent is as follows:

| Basic Mix; | 100 kg |
|---|---|
| Water: | 2 kg |
| Colorant: | 2 kg |
| Ammonia (25%) | 0.5 kg |
| Water | 0.5 kg |
| Formaldehyde Resin | 5 kg |

The colorant can be either Dunkelbraun TT or Neoprint Braun Force. The formaldehyde resin can be either Kaurit M70, a methylmelamine formaldehyde resin or Rolapret MEL, a melamine formaldehyde resin.

The Sub Mix is added to the Basic Mix whilst stirring. It must be noted that the Kaurit can only be added after the Sub Mix has been added to the Basic Mix.

The pot life of the completed formulation is limited to a period of between 2 and 8 hours. The viscosity of the formulation can be modified by the use of thickeners such as CMC.

EXAMPLE 2

Table three shows the characteristic of the flame retardant/heat resistant material of the preferred embodiment of the invention which can be used as backing material in deployment doors for airbags.

TABLE 3

| Yarn Structure | | |
|---|---|---|
| (Warp) | 2 ply 940 dtex | Nylon 6.6 |
| (Fill) | 3 ply 940 dtex | Nylon 6.6 |
| Twist | | |
| (Warp) | Z Twist 60–100 turns/meter | |
| (Fill) | Z Twist 60–100 turns/meter | |
| Construction | | |
| (Warp) | 32 × 2–34 × 2 Yarns/dm | |
| (Fill) | 33–37 Yarns/dm | |
| Elongation at Break | | |
| (Warp) | 20–28 Percent | |
| (Fill) | 24–32 Percent | |
| Fabric Weight (Treated) | 305–325 g/m² | |
| Thickness | 0.92–1.08 mm | |
| Weave Construction | Leno | |

The fabric is of a leno weave construction, which means that the warp yarns are arranged in pairs with one twisted around the other between picks of filling yarn, The fabric is coated with an adhesive "DMK/F12" at 45 grams per square meter. The method of application may be dipping, spraying, immersion or any other commonly used technique.

EXAMPLE 3

Table four shows the characteristics of the flame retardant/heat resistant material of a further embodiment of the invention which also can be used as backing material in deployment doors for airbags.

TABLE 4

| Yarn Structure | | |
|---|---|---|
| (Warp) | 6 ply 1100 dtex | PES |
| (Fill) | 1 ply 1100 dtex | PES |
| Twist | | |
| (Warp) | S Twist 50 turns/meter | |
| (Fill) | Z Twist 75 turns/meter. | |
| Construction | | |
| (Warp) | 79 ends/tm | |
| (Fill) | 21 ends/cm | |
| Elongation at Break | | |
| (Warp) | 28 Percent | |
| (Fill) | 24.5 Percent | |
| Fabric Weight (Treated) | 670 g/m² | |
| Thickness | 1.25 mm | |
| Weave Construction | Gauze | |

The fabric is coated with an adhesive at 106 grams per square meter. The method of application may be dipping, spraying, immersion or any other commonly used coating technique.

EXAMPLE 4

Table five shows the characteristics of the flame retardant/heat resistant of a yet further embodiment of the invention.

TABLE 5

|  | UNITS | STANDARD | MIN | MAX | TEST METHOD |
|---|---|---|---|---|---|
| Yarn Structure | dtex | W 76 × 2 Polyester HT | | | |
| | | F 78 Nylon 6.6 | | | |
| Twist | t/m | W | | | MTP8 |
| | | F | | | |
| Setting | ends | W 51 | 48 | 54 | MTP29 |
| | | F 58 | 55 | 61 | |
| Fabric Strength | deN/5 cm | W | 35 | | MTP11 |
| | | F | 35 | | |
| Elongation at Break | % | W 20.0 | 15 | 25 | MTP11 |
| | | F 50.0 | 40 | 60 | |
| Fabric Weight | g/m² | 140 | 125 | 155 | MTP5 |
| Fabric Gauge | mm | W 0.50 | .45 | .55 | MTP28.1 |
| Weave | | Tricot Knitted | | | |

The fabric is coated with the adhesive of the present invention. The method of application may be dipping, spraying, immersion or any other commonly used coating technique.

Nature of the Cloth Material

In the preferred embodiment of, the invention the cloth material is of a knitted construction.

Application of the Material

The flame retardant/heat resistant cloth material of the invention can be used in automobile products such as airbag deployment doors, bumpers and car seat tie downs as well as household applications such as pipes. The cloth is attached to the plastics used in these cases by standard techniques.

There are of course, many alternative embodiments and modifications of the present invention which are to be included within the spirit and scope of the following claims.

What is claimed is:

1. A flame retardant/heat resistant agent comprising antimony, phosphorus oxide compounds, and at least one anionic carboxyl group containing chlorinated acrylonitrile copolymer, wherein said at least one copolymer is solely composed of three different types of monomers, wherein a first monomer is selected from the group consisting of at least one dichloroalkane, wherein a second monomer is selected from the group consisting of at least one acrylonitrile, and a third monomer is selected from the group consisting of at least one alkyl acrylate.

2. The flame retardant/heat resistant agent of claim 1 further comprising at least one compound selected from the group including at least one silicate and at least one melamine cyanurate.

3. A spray composition comprising the flame retardant/heat resistant agent as claimed in claim 1.

4. A spray composition comprising the flame retardant/heat resistant agent as claimed in claim 2.

5. An adhesive formulation comprising the flame retardant/heat resistant agent as claimed in claim 1.

6. An adhesive formulation comprising the flame retardant/heat resistant agent as claimed in claim 2.

7. The flame retardant/heat resistant agent as claimed in claim 1, wherein said antimony compounds are selected from the group consisting of antimony trioxide, antimony pentoxide, and a mixture of both, and said phosphorus oxide compounds are selected from at least one ammonium salt of polyphosphate.

8. The flame retardant/heat resistant agent as claimed in claim 2, wherein said antimony compounds are selected from the group consisting of antimony trioxide, antimony pentoxide, and a mixture of both, and said phosphorus oxide compounds are selected from at least one ammonium salt of polyphosphate.

9. The flame retardant/heat resistant agent as claimed in claim 3, wherein said antimony compounds are selected from the group consisting of antimony trioxide, antimony pentoxide, and a mixture of both, and said phosphorus oxide compounds are selected from at least one ammonium salt of polyphosphate.

10. The flame retardant/heat resistant agent as claimed in claim 4, wherein said antimony compounds are selected from the group consisting of antimony trioxide, antimony pentoxide, and a mixture of both, and said phosphorus oxide compounds are selected from at least one ammonium salt of polyphosphate.

11. The flame retardant/heat resistant agent as claimed in claim 5, wherein said antimony compounds are selected from the group consisting of antimony trioxide, antimony pentoxide, and a mixture of both, and said phosphorus oxide compounds are selected from at least one ammonium salt of polyphosphate.

12. The flame retardant/heat resistant agent as claimed in claim 6, wherein said antimony compounds are selected from the group consisting of antimony trioxide, antimony pentoxide, and a mixture of both, and said phosphorus oxide compounds are selected from at least one ammonium salt of polyphosphate.

13. The flame retardant/heat resistant agent as claimed in claim 2, wherein said flame retardant/heat resistant agent is a mixture of at least one melamine cyanurate, at least one silicate, at least one ammonium polyphosphate, and at least one antimony oxide.

14. A fabric material, at least a portion of which has been coated with the flame retardant/heat resistant agent as claimed in claim 1, wherein said flame retardant/heat resistant agent is applied in an amount of between about 40 and 110 grams per square meter of said fabric material.

15. A fabric material, at least a portion of which has been coated with the flame retardant/heat resistant agent as claimed in claim 2, wherein said flame retardant/heat resistant agent is applied in an amount of between about 40 and 110 grams per square meter of said fabric material.

16. A fabric material, at least a portion of which has been coated with the flame retardant/heat resistant agent as claimed in claim 5, wherein said flame retardant/heat resistant agent is applied in an amount of between about 40 and 110 grams per square meter of said fabric material.

17. The flame retardant/heat resistant adhesive as claimed in claim 5, wherein said adhesive is based upon melamine cyanurate.

18. The fabric material of claim 14, wherein said coated fabric material exhibits thermostability of between 240 and 260° C. and a high cohesion and adhesion to plastic materials.

19. The fabric material of claim 15, wherein said coated fabric material exhibits thermostability of between 240 and 260° C. and a high cohesion and adhesion to plastic materials.

20. The fabric material of claim 16, wherein said coated fabric material exhibits thermostability of between 240 and 260° C. and a high cohesion and adhesion to plastic materials.

21. A deployment door for an automobile airbag comprising a fabric to which is applied the flame retardant/heat resistant agent of claim 1.

22. A deployment door for an automobile airbag comprising the fabric material of claim 14.

23. A thermoplastic construction comprising a strengthening material comprising the fabric material of claim 14.

24. A thermoplastic construction comprising a strengthening material comprising the fabric material of claim 18.

* * * * *